(12) United States Patent
Lin et al.

(10) Patent No.: US 9,285,642 B2
(45) Date of Patent: Mar. 15, 2016

(54) PIXEL ARRAY

(71) Applicant: Au Optronics Corporation, Hsinchu (TW)

(72) Inventors: Po-Nien Lin, Taipei (TW); Yu-Ching Wu, Hsinchu County (TW); Tien-Lun Ting, Taichung (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 14/612,298

(22) Filed: Feb. 3, 2015

(65) Prior Publication Data

US 2016/0033833 A1    Feb. 4, 2016

(30) Foreign Application Priority Data

Jul. 31, 2014 (TW) .............................. 103126195 A

(51) Int. Cl.
| | |
|---|---|
| *H01L 29/786* | (2006.01) |
| *G09G 5/10* | (2006.01) |
| *G02F 1/1362* | (2006.01) |
| *G02F 1/133* | (2006.01) |
| *G02F 1/1368* | (2006.01) |

(52) U.S. Cl.
CPC ........ *G02F 1/136213* (2013.01); *G02F 1/1368* (2013.01); *G02F 1/13306* (2013.01); *G02F 1/136286* (2013.01)

(58) Field of Classification Search
CPC .......... G02F 1/136213; G02F 1/13306; G02F 1/136286; G02F 1/1368; H01L 27/1214; H01L 27/1255
USPC .......................... 257/59, 72, 71; 345/690, 212
See application file for complete search history.

(56) References Cited

U.S. PATENT DOCUMENTS

| | | | |
|---|---|---|---|
| 8,791,928 B2 * | 7/2014 | Chen ..................... | G06F 3/0412 345/204 |
| 2003/0030630 A1 | 2/2003 | Bayot et al. | |

FOREIGN PATENT DOCUMENTS

| | | |
|---|---|---|
| TW | 201115241 | 5/2011 |
| TW | I402596 | 7/2013 |

\* cited by examiner

*Primary Examiner* — Tu-Tu Ho
(74) *Attorney, Agent, or Firm* — Jianq Chyun IP Office

(57) ABSTRACT

A pixel array includes pixel units. A gate of a sharing switch device is electrically connected to a signal line. A source of the sharing switch device is electrically connected to an active device and a sub-pixel electrode. A terminal of a first capacitance Cpp is electrically connected to the source of the sharing switch device and the sub-pixel electrode. Another terminal of the first capacitance Cpp is electrically connected to a main pixel electrode of the next pixel unit. A terminal of a second capacitance Ccc is electrically connected to a drain of the sharing switch device. Another terminal of the second capacitance Ccc is electrically connected to the main pixel electrode of the next pixel unit. 5%≤(Ccc/Cpp)≤25%.

12 Claims, 7 Drawing Sheets

PIXEL ARRAY

CROSS-REFERENCE TO RELATED APPLICATION

This application claims the priority benefit of Taiwan application serial no. 103126195, filed on Jul. 31, 2014. The entirety of the above-mentioned patent application is hereby incorporated by reference herein and made a part of this specification.

BACKGROUND OF THE INVENTION

1. Field of the Invention

The invention relates to an array of electronic devices. More particularly, the invention relates to a pixel array.

2. Description of Related Art

With the continuous development of the liquid crystal display toward a large-size specification, in order to overcome the issue of viewing angle of large-size display, the wide viewing angle techniques of the liquid crystal display panel also need to continuously progress and advance. For instance, a multi-domain vertical alignment (MVA) liquid crystal display panel and an advanced MVA (AMVA) liquid crystal display panel are common existing wide viewing angle techniques. The AMVA liquid crystal display panel can effective alleviate the issue of color washout of the MVA liquid crystal display panel. Therefore, the AMVA liquid crystal display panel is generally used for high-end display products as the display panel thereof.

In addition to displaying a good quality two-dimensional screen, consumers also prefer high-end display products to be able to provide a high-resolution three-dimensional screen. To increase the resolution of the three-dimensional screen displayed by high-end display products, a special pixel array structure and a special driving method are used for the display panel of high-end display products at the same time to achieve increased resolution of the three-dimensional screen. However, when the display panel of high-end display products is switched to a two-dimensional display mode and an overall low-grayscale screen (i.e., when all of the pixel units of the display panel display the same low brightness) is displayed, abnormal bright/dark lines appear on a specific position of the display panel, thus significantly affecting display quality.

SUMMARY OF THE INVENTION

The invention provides a pixel array. The display quality of a display panel formed by the pixel array is good.

The invention provides a pixel array including a plurality of pixel units, wherein each of the pixel units includes a scan line and a data line, an active device electrically connected to the scan line and the data line, a main pixel electrode and a sub-pixel electrode respectively electrically connected to the active device and separated from each other, a signal line disposed parallel to the scan line, a sharing switch device including a gate, a source, and a drain, a sharing capacitor electrically connected to the drain of the sharing switch device, a first capacitance Cpp, and a second capacitance Ccc. The gate of the sharing switch device is electrically connected to the signal line. The source of the sharing switch device is electrically connected to the active device and the sub-pixel electrode. A terminal of the first capacitance Cpp is electrically connected to the source of the sharing switch device and the sub-pixel electrode. Another terminal of the first capacitance Cpp is electrically connected to a main pixel electrode of the next pixel unit. A terminal of the second capacitance Ccc is electrically connected to the drain of the sharing switch device. Another ten final of the second capacitance Ccc is electrically connected to the main pixel electrode of the next pixel unit. $5\% \leq (Ccc/Cpp) \leq 25\%$.

Based on the above, since in a pixel unit of a pixel array of an embodiment of the invention, (Ccc/Cpp) is designed in a specific range of 5% to 25%, via a self-compensation mechanism of the second capacitance Ccc and the first capacitance Cpp, the voltage on a liquid crystal capacitance of the next pixel unit does not readily excessively affect the voltage on the liquid crystal capacitance of a pixel unit. Therefore, the issue of bright/dark lines in the known techniques is alleviated.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
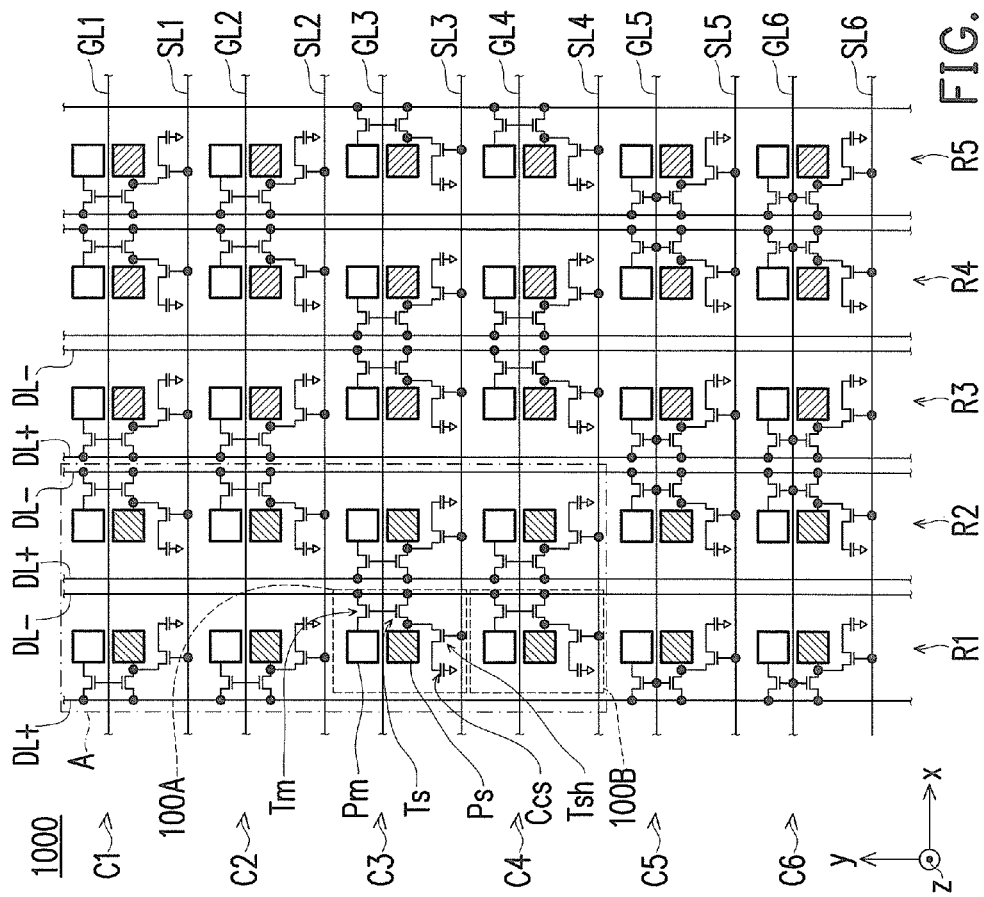
FIG. 1 is a schematic of a pixel array according to an embodiment of the invention.
Figure 4:
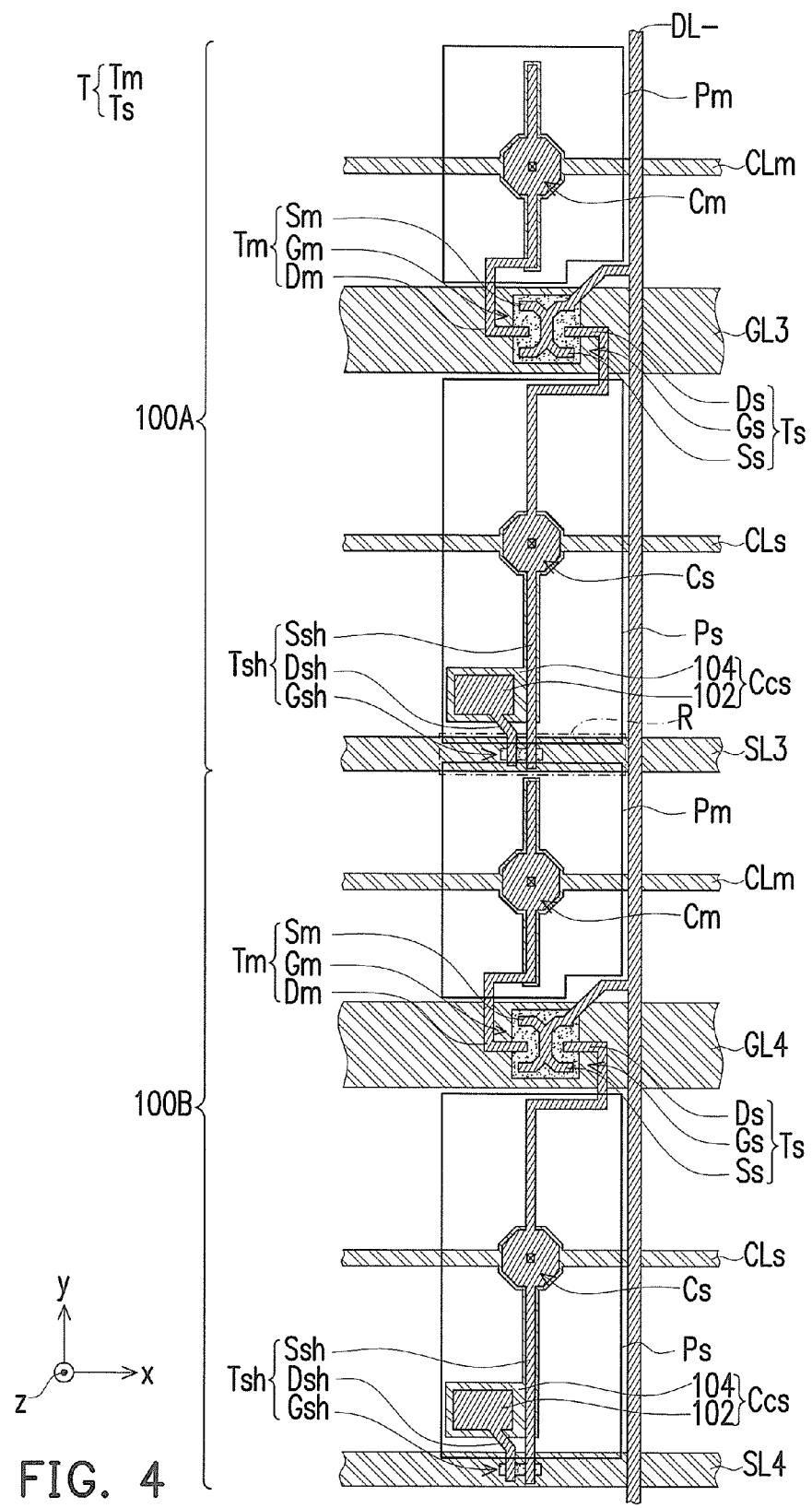
FIG. 4 shows a layout of two adjacent pixel units of FIG. 1 located in the same row.
Figure 5:
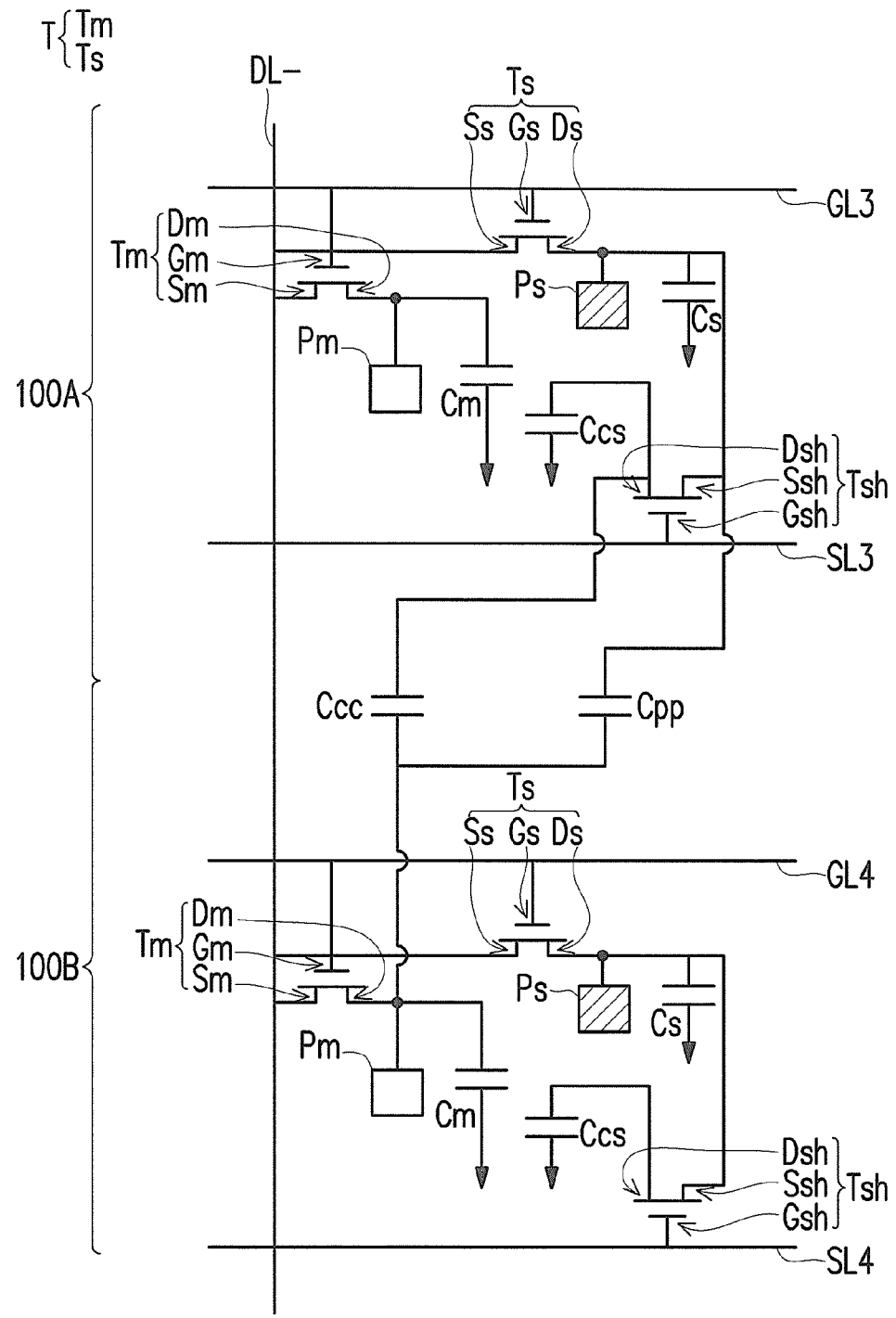
FIG. 5 is a schematic of an equivalent circuit of two pixel units of FIG. 4.

FIG. 1 is a schematic of a pixel array according to an embodiment of the invention. FIG. 4 shows a layout of two adjacent pixel units of FIG. 1 located in the same row. FIG. 5 is a schematic of an equivalent circuit of two pixel units of FIG. 4. Referring to FIG. 1, FIG. 4, and FIG. 5, a pixel array 1000 includes a plurality of pixel units 100A and 100B. Each of the pixel units 100A includes a scan line GL3, a data line DL–, an active device T electrically connected to the scan line GL3 and the data line DL–, a main pixel electrode Pm and a sub-pixel electrode Ps respectively electrically connected to the active device T and separated from each other, a signal line SL3 disposed parallel to the scan line GL3, a sharing switch device Tsh having a gate Gsh, a source Ssh and a drain Dsh, a sharing capacitor Ccs, a first capacitance Cpp, and a second capacitance Ccc. The gate Gsh of the sharing switch device Tsh is electrically connected to the signal line SL3. The source Ssh of the sharing switch device Tsh is electrically connected to the active device T and the sub-pixel electrode Ps. The sharing capacitor Ccs is electrically connected to the drain Dsh of the sharing switch device Tsh. A terminal of the first capacitance Cpp is electrically connected to the source Ssh of the sharing switch device Tsh and the sub-pixel electrode Ps. Another terminal of the first capacitance Cpp is electrically connected to the main pixel electrode Pm of the next pixel unit 100B. A terminal of the second capacitance Ccc is electrically connected to the drain Dsh of the sharing switch device Tsh. Another terminal of the second capacitance Ccc is electrically connected to the main pixel electrode Pm of the next pixel unit 100B.

Specifically, in the present embodiment, the active device T can include a main active device Tm having a gate Gm, a source Sm, and a drain Dm and a sub-active device Ts having a gate Gs, a source Ss, and a drain Ds. The drain Dm of the main active device Tm can be in electrical contact with the main pixel electrode Pm. The drain Ds of the sub-active device Ts can be in electrical contact with the sub-pixel electrode Ps. The source Sm of the main active device Tm and the source Ss of the sub-active device Ts can be in electrical contact with the same data line DL−. The gate Gm of the main active device Tm and the gate Gs of the sub-active device Ts can be in electrical contact with the same scan line GL3. The source Ssh of the sharing switch device Tsh can be in electrical contact with the drain Ds of the sub-active device Ts or the sub-pixel electrode Ps. Alternatively, the source Ssh of the sharing switch device Tsh can be in electrical contact with the drain Ds of the sub-active device Ts and the sub-pixel electrode Ps at the same time. The gate Gsh of the sharing switch device Tsh can be in electrical contact with the signal line SL3. The sharing capacitor Ccs includes an upper electrode 102 and a lower electrode 104 (labeled in FIG. 4). The lower electrode 104 is electrically connected to a common voltage line CLs (labeled in FIG. 4) having a common voltage, and the drain Dsh of the sharing switch device Tsh is electrically connected to the upper electrode 102 of the sharing capacitor Ccs.

In the present embodiment, the plurality of pixel units 100A and 100B of the pixel array 1000 can be arranged in a plurality of rows and a plurality of columns. FIG. 1 shows five rows of R1 to R5 and six columns of C1 to C6 as example, but the pixel array of the invention is not limited thereto. The number of rows and the number of columns of the pixel units in the pixel array can both be decided according to actual demand. The data lines of the plurality of pixel units are divided into a plurality of first-polarity data lines DL+ and a plurality of second-polarity data lines DL−. During the same period, the polarity of a plurality of data signals respectively inputted to the first-polarity data lines DL+ and the second-polarity data lines DL− can be opposite. In the present embodiment, the first-polarity data lines DL+ are positive-polarity data lines, and the second-polarity data lines DL− are negative-polarity data lines. However, the invention is not limited thereto. In other embodiments, the first-polarity data lines DL+ can also be negative-polarity data lines, and the second-polarity data lines DL− can also be positive-polarity data lines.

In the plurality of pixel units 100 in the first row R1, the plurality of active devices T (such as the main active device Tm and the sub-active device Ts) in the plurality of pixel units 100A and 100B located in the first row R1 and the first column C1 and located in the first row R1 and the second column C2 can be electrically connected to a corresponding first-polarity data line DL+, and the plurality of active devices T in the plurality of pixel units 100A and 100B located in the first row R1 and the third column C3 and located in the first row R1 and the fourth column C4 can be electrically connected to a corresponding second-polarity data line DL−. In the pixel units 100A and 100B in the second row R2, the plurality of active devices T in the plurality of pixel units 100A and 100B located in the second row R2 and the first column C1 and located in the second row R2 and the second column C2 can be electrically connected to another corresponding second-polarity data line DL−, and the plurality of active devices T in the plurality of pixel units 100A and 100B located in the second row R2 and the third column C3 and located in the second row R2 and the fourth column C4 can be electrically connected to another corresponding first-polarity data line DL+. In the pixel units 100A and 100B in the third row R3, the plurality of active devices T in the plurality of pixel units 100A and 100B located in the third row R3 and the first column C1 and located in the third row R3 and the second column C2 are electrically connected to yet another corresponding first-polarity data line DL+, and the plurality of active devices T in the plurality of pixel units 100A and 100B located in the third row R3 and the third column C3 and located in the third row R3 and the fourth column C4 are electrically connected to yet another corresponding second-polarity data line DL−.

In other words, in the present embodiment, the plurality of pixel units 100A and 100B respectively located in the first row R1 and the first column C1, the first row R1 and the second column C2, the first row R1 and the third column C3, the first row R1 and the fourth column C4, the second row R2 and the first column C1, the second row R2 and the second column C2, the second row R2 and the third column C3, and the second row R2 and the fourth column C4 can form a repeating unit A. A plurality of repeating units A can be arranged in an array along a row direction y and a column direction x interleaved with each other, thus forming the entire pixel array 1000.

In the present embodiment, the pixel units 100A and 100B located in the first row R1 are, for instance, red pixel units, the pixel units 100A and 100B located in the second row R2 are, for instance, green pixel units, and the pixel units 100A and 100B located in the third row R3 are, for instance, blue pixel units. However, the invention does not limit a pixel unit at a specific location to display a specific color. The color types displayed by the plurality of pixel units and the disposition method among the plurality of pixel units respectively displaying a plurality of different colors of the invention can both be suitably designed according to actual demand. For instance, in another embodiment of the invention, if the color saturation of the display screen of the pixel array is to be increased, then the pixel units located in the first row can optionally be designed as red pixel units, the pixel units located in the second row can optionally be designed as green pixel units, the pixel units located in the third row can optionally be designed as blue pixel units, and the pixel units located in the fourth row can optionally be designed as yellow pixel units. In yet another embodiment of the invention, if the brightness of the display screen of the pixel array is to be increased, then the pixel units located in the first row can optionally be designed as red pixel units, the pixel units located in the second row can optionally be designed as green pixel units, the pixel units located in the third row can optionally be designed as blue pixel units, and the pixel units located in the fourth row can optionally be designed as white pixel units.

Figure 2:
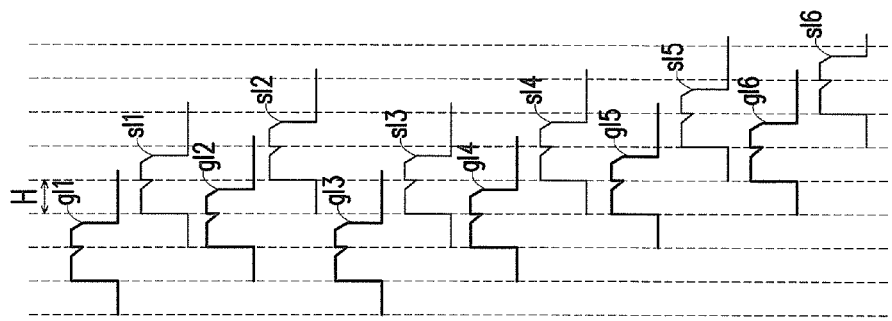
FIG. 2 shows a plurality of scanning signals and a plurality of switching signals respectively inputted to a plurality of scan lines and a plurality of signal lines when the pixel array of FIG. 1 is switched to a two-dimensional display mode.

The pixel array 1000 of the present embodiment can be switched to a two-dimensional display mode or a three-dimensional display mode. FIG. 2 shows a plurality of scanning signals and a plurality of switching signals respectively inputted to a plurality of scan lines and a plurality of signal lines when the pixel array of FIG. 1 is switched to a two-dimensional display mode. Referring to FIG. 1 and FIG. 2, when the pixel array 1000 is switched to a two-dimensional display mode, scanning signals gl1 to gl6 of FIG. 2 are respectively inputted to scan lines GL1 to GL6 of FIG. 1, wherein the scan lines GL1 to GL6 are respectively electrically connected to the plurality of gates Gm and Gs (labeled in FIG. 4) of the plurality of active devices T (such as the main active device Tm and the sub-active device Ts) located in the first to sixth columns C1 to C6, switching signals sl1 to sl6 of FIG. 2 are respectively inputted to signal lines SL1 to SL6 of FIG. 1, wherein the signal lines SL1 to SL6 are respectively electrically connected to the plurality of gates Gsh (labeled in FIG. 4) of the plurality of sharing switch devices Tsh located in the first to sixth columns C1 to C6. It should be mentioned that, although in FIG. 1 and FIG. 2, six scan lines GL1 to GL6, six signal lines SL1 to SL6, six scanning signals gl1 to gl6, and six switching signals sl1 to sl6 are shown as example, those having ordinary skill in the art can determine the scanning signals gl1 to gln and the switching signals sl1 to sln driving the entire pixel array 1000 in a two-dimensional display mode according to FIG. 1, FIG. 2, and the following description. The scanning signal gln refers to the scanning signal of an nth scan line GLn inputted to the pixel array 1000. The nth scan line GLn is electrically connected to the plurality of gates Gm and Gs of the plurality of active devices T (such as the main active device Tm and the sub-active device Ts) located in the nth column. The switching signal sln refers to the switching signal of an nth signal line SLn inputted to the pixel array 1000. The nth signal line SLn is electrically connected to the plurality of gates Gsh of the plurality of sharing switch devices Tsh located in the nth column. n is a positive integer greater than or equal to 4.

As shown in FIG. 2, when the pixel array is switched to a two-dimensional display mode, within the time of one frame, the scanning signals gl1 to gln and the switching signals sl1 to sln can be divided into a plurality of groups [gl1 to gl4, sl1 to sl4], [gl5 to gl8, sl5 to sl8] . . . [gl(n−3) to gln, sl(n−3) to sln]. The first and third scanning signals gl1 and gl3 of each of the groups (such as gl1 to gl4 and sl1 to sl4) are synchronized, the second and fourth scanning signals gl2 and gl4 of the group (such as gl1 to gl4) are synchronized, and the time point of the second scanning signal gl2 turning on the main active device Tm and the sub-active device Ts is late by a time distance H in comparison to the time point of the first scanning signal gl1 turning on the main active device Tm and the sub-active device Ts. The time point of the first scanning signal gl5 of the next group (such as gl5 to gl8 and sl5 to sl8) turning on the main active device Tm and the sub-active device Ts is late by two time distances H in comparison to the time point of the first scanning signal gl1 of the last group (such as gl1 to gl4 and sl1 to sl4) turning on the main active device Tm and the sub-active device Ts. According to the above rules, those having ordinary skill in the art can determine what the scanning signals gl1 to gln and the switching signals sl1 to sln driving the entire pixel array 1000 in a two-dimensional display mode are.

Figure 3:
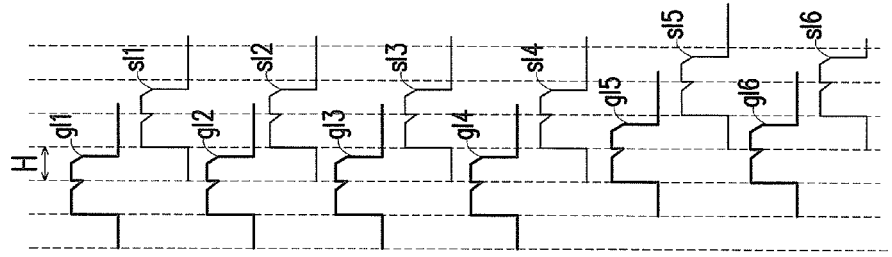
FIG. 3 shows a plurality of scanning signals and a plurality of switching signals respectively inputted to a plurality of scan lines and a plurality of signal lines when the pixel array of FIG. 1 is switched to a three-dimensional display mode.

FIG. 3 shows a plurality of scanning signals and a plurality of switching signals respectively inputted to a plurality of scan lines and a plurality of signal lines when the pixel array of FIG. 1 is switched to a three-dimensional display mode. Referring to FIG. 1 and FIG. 3, when the pixel array 1000 is switched to a three-dimensional display mode, the scanning signals gl1 to gl6 of FIG. 3 are respectively inputted to the scan lines GL1 to GL6 of FIG. 1, and the switching signals sl1 to sl6 of FIG. 3 are respectively inputted to the signal lines SL1 to SL6 of FIG. 1. It should be mentioned that, although in FIG. 1 and FIG. 3, six scan lines GL1 to GL6, six scan lines SL1 to SL6, six scanning signals gl1 to gl6, and six switching signals sl1 to sl6 are shown as example, those having ordinary skill in the art can determine the scanning signals gl1 to gln and the switching signals sl1 to sln driving the entire pixel array 1000 in a three-dimensional display mode according to FIG. 1, FIG. 3, and the following description.

As shown in FIG. 3, when the pixel array is switched to a three-dimensional display mode, within the time of one frame, the scanning signals gl1 to gln and the switching signals sl1 to sln can be divided into the plurality of groups [gl1 to gl4, sl1 to sl4], [gl5 to gl8, sl5 to sl8] . . . [gl(n−3) to gln, sl(n−3) to sln]. All of the scanning signals (such as gl1 to gl4) of each of the groups (such as gl1 to gl4 and sl1 to sl4) are synchronized, all of the switching signals (such as sl1 to sl4) of the group, and the time point of any scanning signal (such as gl1) of the group turning on the main active device Tm and the sub-active device Ts is late by two time distances H in comparison to the time point of any scanning signal (such as sl1) of the group turning on the sharing switch device Tsh. The time point of the first scanning signal gl5 of the next group (such as gl5 to gl8 and sl5 to sl8) turning on the main active device Tm and the sub-active device Ts is late by a time distance H in comparison to the time point of the first scanning signal gl1 of the last group (such as gl1 to gl4 and sl1 to sl4) turning on the main active device Tm and the sub-active device Ts. According to the above rules, those having ordinary skill in the art can determine what the scanning signals gl1 to gln and the switching signals sl1 to sln driving the entire pixel array 1000 in a three-dimensional display mode are.

Referring to FIG. 2 and FIG. 3, the time point of the scanning signal of each of the groups [gl1 to gl4, sl1 to sl4], [gl5 to gl8, sl5 to sl8] . . . [gl(n−3) to gln, sl(n−3) to sln] switched from high gate voltage to low gate voltage is compared with the time point of the next scanning signal switched from high gate voltage to low gate voltage. For instance, referring to FIG. 1 and FIG. 2, the scanning signal gl1 and the next scanning signal gl2 are compared, the scanning signal gl2 and the next scanning signal gl3 are compared, the scanning signal gl3 and the next scanning signal gl4 are compared . . . etc. Moreover, the time point of a scanning signal of each of the other groups [gl5 to gl8, sl5 to sl8] . . . [gl(n−3) to gln, sl(n−3) to sln] switched from high gate voltage to low gate voltage is compared with the time point of the next scanning signal switched from high gate voltage to low gate voltage.

It can be known by comparing the time point of a scanning signal of each of the groups [gl1 to gl4, sl1 to sl4], [gl5 to gl8, sl5 to sl8] . . . [gl(n−3) to gln, sl(n−3) to sln] in FIG. 2 and FIG. 3 switched from high gate voltage to low gate voltage and the time point of the next scanning signal switched from high gate voltage to low gate voltage according to the above method that, when the pixel array 1000 is switched to a two-dimensional display mode (i.e., when the pixel array 1000 is driven by the plurality of scanning signals and the plurality of switching signals of FIG. 2), the time point of the third scanning signal gl3 of each of the groups (such as gl1 to gl4 and sl1 to sl4) switched from high gate voltage to low gate voltage is early in comparison to the time point of the last scanning signal gl2 switched from high gate voltage to low gate voltage. In other words, if the pixel array 1000 and the display medium (such as a liquid crystal) of FIG. 1 and the opposite substrate form a display panel and the display panel is used to display an overall low-grayscale screen having a single brightness, then the charging of the plurality of liquid crystal capacitances formed by the main pixel electrode Pm and the sub-pixel electrode Ps of the pixel units in the third column C3 is complete before the charging of the liquid crystal capacitances formed by the main pixel electrode Pm and the sub-pixel electrode Ps of the pixel units in the second column C2. As a result, the voltage on the liquid crystal capacitances of the pixel units in the third column C3 is higher than the voltage on the liquid crystal capacitances of the pixel units in the second column C2 at a certain time point. At this point, if the pixel array 1000 does not have a special electrical design, then the voltage on the liquid crystal capacitances of the pixel units in the third column C3 is readily excessively dispersed onto the liquid crystal capacitances of the pixel units in the second column C2 via a capacitive coupling effect. As a result, the voltage on the liquid crystal capacitances of the pixel units in the third column C3 is different from a predetermined voltage, thus causing the issue of bright/dark lines in the known techniques. However, the pixel array 1000 of an embodiment of the invention can alleviate the issue via a special self-capacitance compensation design as described in the following with FIG. 4, FIG. 5, FIG. 6, and FIG. 7.

Figure 6:
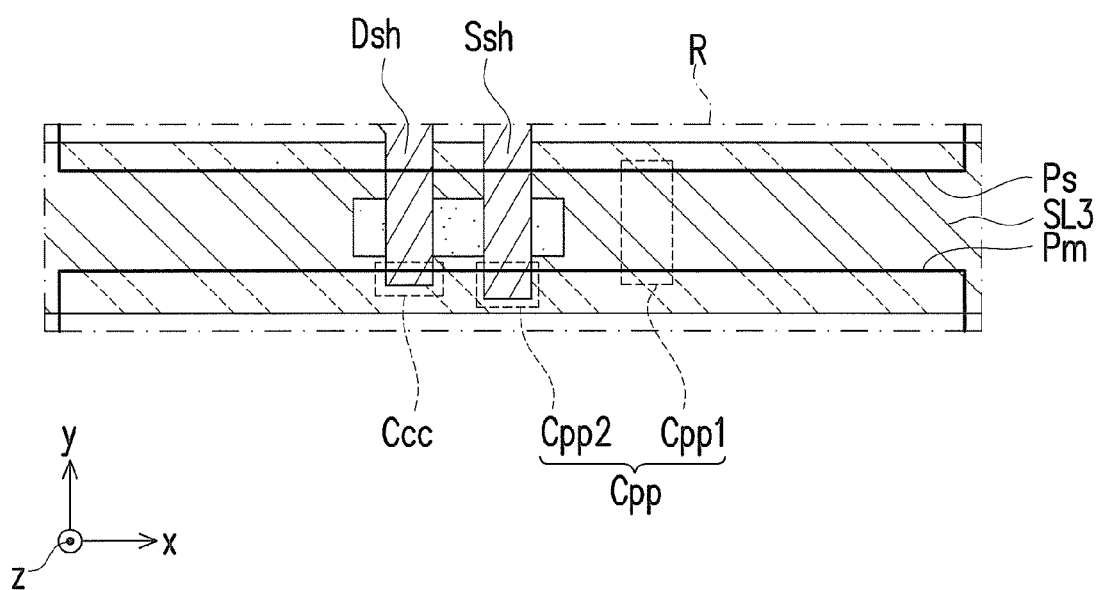
FIG. 6 is an enlarged schematic of a partial region R of FIG. 4.

FIG. 6 is an enlarged schematic of a partial region R of FIG. 4. Referring to FIG. 4, FIG. 5, and FIG. 6, in the present embodiment, the signal line SL3 of each of the pixel units 100A can be located between the sub-pixel electrode Ps of the pixel unit 100A and the main pixel electrode Pm of the next pixel unit 100B. The scan line GL3 of each of the pixel units 100A can be located between the corresponding main pixel electrode Pm and sub-pixel electrode Ps.

In the present embodiment, each of the pixel units 100A further includes a main storage capacitor Cm electrically connected to the main pixel electrode Pm. For instance, the main storage capacitor Cm can be formed by the drain Dm of the main active device Tm and a common voltage line CLm overlapped with the drain Dm in the z-direction. However, the invention is not limited thereto, and the main storage capacitor Cm can also be formed by other methods. Each of the pixel units 100A further includes a sub-storage capacitor Cs electrically connected to the sub-pixel electrode Ps. For instance, the sub-storage capacitor Cs can be formed by the source Ss of the sub-active device Ts and the common voltage line CLs overlapped with the source Ss in the z-direction. However, the invention is not limited thereto, and the sub-storage capacitor Cs can also be formed by other methods. The common voltage line CLs and the common voltage line CLm have the same common voltage. In the present embodiment, the sharing capacitor Ccs can be formed by the drain Dsh of the sharing switch device Tsh and the common voltage line CLs overlapped with the drain Dsh in the z-direction. Specifically, the drain Dsh of the sharing switch device Tsh and the upper electrode 102 of the sharing capacitor Ccs can belong to the same conductive pattern, and the common voltage line CLs overlapped with the drain Dsh in the z-direction and the lower electrode 104 of the sharing capacitor Ccs can belong to the same conductive pattern. However, the invention is not limited thereto, and the upper and lower electrodes of the sharing capacitor Ccs can also be in other suitable configurations.

The coupling capacitance Cpp1 can optionally be formed by the sub-pixel electrode Ps of each of the pixel units 100A and the main pixel electrode Pm of the next pixel electrode 100B. Specifically, the sub-pixel electrode Ps of each of the pixel units 100A and the main pixel electrode Pm of the next pixel unit 100B are overlapped in the row direction y and a dielectric substance (not shown) is between the two, thus forming the coupling capacitance Cpp1. The coupling capacitance Cpp2 can optionally be formed by the source Ssh of the sharing switch device Tsh of each of the pixel units 100A and the main pixel electrode Pm of the next pixel unit 100B. Specifically, the source Ssh of the sharing switch device Tsh of each of the pixel units 100A and the main pixel electrode Pm of the next pixel unit 100B are overlapped in the z-direction perpendicular to the row direction y and the column direction x and a dielectric substance (not shown) is between the two, thus forming the coupling capacitance Cpp2. The sum of the coupling capacitance Cpp1 and the coupling capacitance Cpp2 is the first capacitance Cpp (labeled in FIG. 5 and FIG. 6). The second capacitance Ccc (labeled in FIG. 5 and FIG. 6) can optionally be formed by the drain Dsh of the sharing switch device Tsh of each of the pixel units 100A and the main pixel electrode Pm of the next pixel unit 100B. Specifically, the drain Dsh of the sharing switch device Tsh of each of the pixel units 100A and the main pixel electrode Pm of the next pixel unit 100B are overlapped in the z-direction and a dielectric substance (not shown) is between the two, thus forming the second capacitance Ccc (labeled in FIG. 5 and FIG. 6). It should be mentioned that, the specific configurations of the first capacitance Cpp and the second capacitance Ccc are exemplary and are not intended to limit the invention. In other embodiments, the specific configurations of the first capacitance Cpp and the second capacitance Ccc can also be other suitable forms. Regardless of the specific configurations of the first capacitance Cpp and the second capacitance Ccc, provided the electrical relationship between the first capacitance Cpp and the second capacitance Ccc and the other components of the pixel array is as shown in FIG. 5, the first capacitance Cpp and the second capacitance Ccc are both within the scope of the invention to be protected.

It should be mentioned that, (Ccc/Cpp) is designed in the range of 5% to 25%. In this way, even if the charging of the liquid crystal capacitance formed by the main pixel electrode Pm and the sub-pixel electrode Ps of the next pixel unit 100B is complete before the charging of the liquid crystal capacitance formed by the main pixel electrode Pm and the sub-pixel electrode Ps of the pixel unit 100A, via the self-compensation mechanism of the second capacitance Ccc and the first capacitance Cpp, the voltage on the liquid crystal capacitance of the next pixel unit 100B is not readily excessively dispersed onto the liquid crystal capacitance of the pixel unit 100A. As a result, the issue of bright/dark lines in the known techniques is alleviated.

Figure 7:
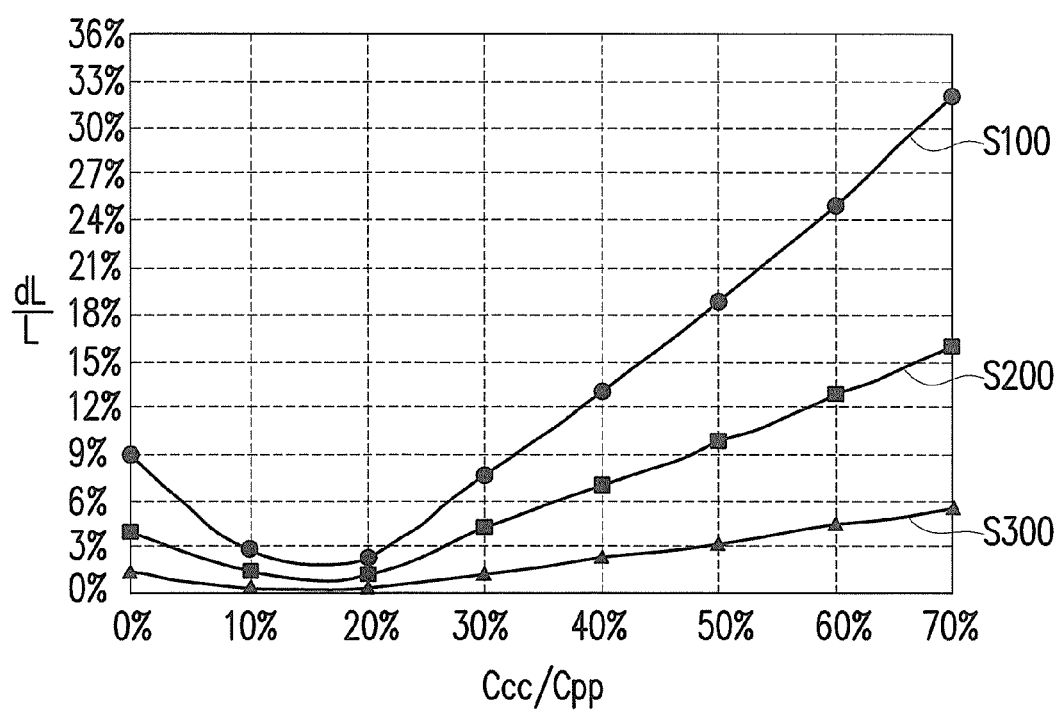
FIG. 7 shows the relationship between (Ccc/Cpp) and (dL/L).

FIG. 7 shows the relationship between (Ccc/Cpp) and (dL/L). L is the desired brightness of each of the pixel units 100A and 100B, and dL is the absolute value of the difference in brightness between a pixel unit 100A and the next pixel unit 100B. A curve S100 shows the relationship between (Ccc/Cpp) and (dL/L) when the voltage value of each of the data lines DL+ and DL− inputted to the pixel array 1000 is the same first low-grayscale voltage V1. A curve S200 shows the relationship between (Ccc/Cpp) and (dL/L) when the voltage value of each of the data lines DL+ and DL− inputted to the pixel array 1000 is the same second low-grayscale voltage V2. A curve S300 shows the relationship between (Ccc/Cpp) and (dL/L) when the voltage value of each of the data lines DL+ and DL− inputted to the pixel array 1000 is the same third low-grayscale voltage V3. The first, second, and third low-grayscale voltages V1, V2, and V3 are all used to make the pixel array 1000 display an overall low-grayscale screen (i.e., display an overall low-brightness screen), wherein V1<V2<V3. For instance, the first, second, and third low-grayscale voltages V1, V2, and V3 are respectively 2.65 V, 2.7 V, and 2.74 V. The data shown in FIG. 7 is evidence that when (Ccc/Cpp) of the pixel array 1000 is designed in the range of 5% to 25% (particularly 10% to 20%), dL/L is relatively small. That is, the difference in brightness dL between a pixel unit 100A and the next pixel unit 100B is relatively small. In other words, when (Ccc/Cpp) is designed in the range of 5% to 25% (particularly 10% to 20%), the issue of bright/dark lines in the known techniques can be alleviated.

Figure 8:
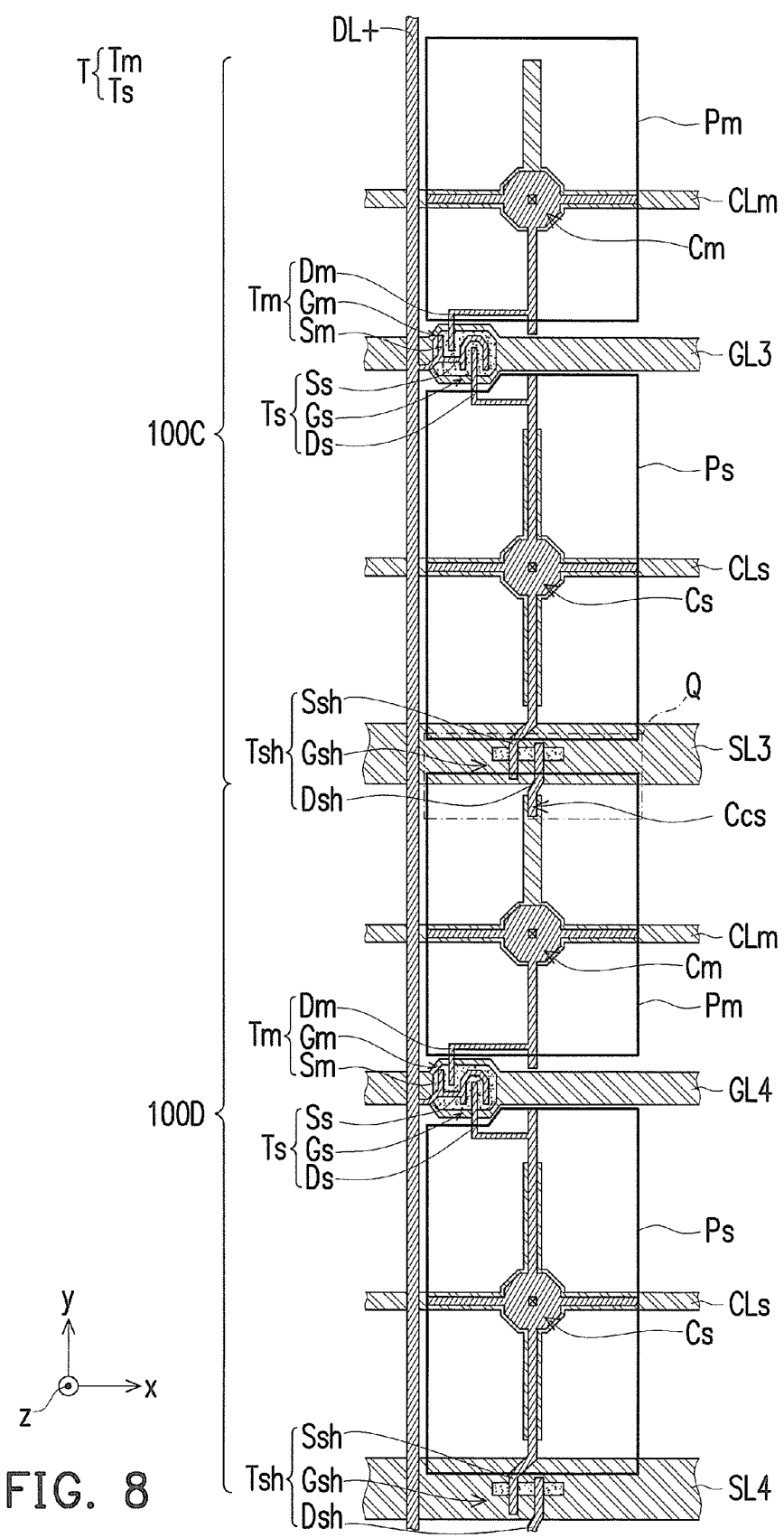
FIG. 8 shows another layout of two adjacent pixel units of FIG. 1 located in the same row.
Figure 9:
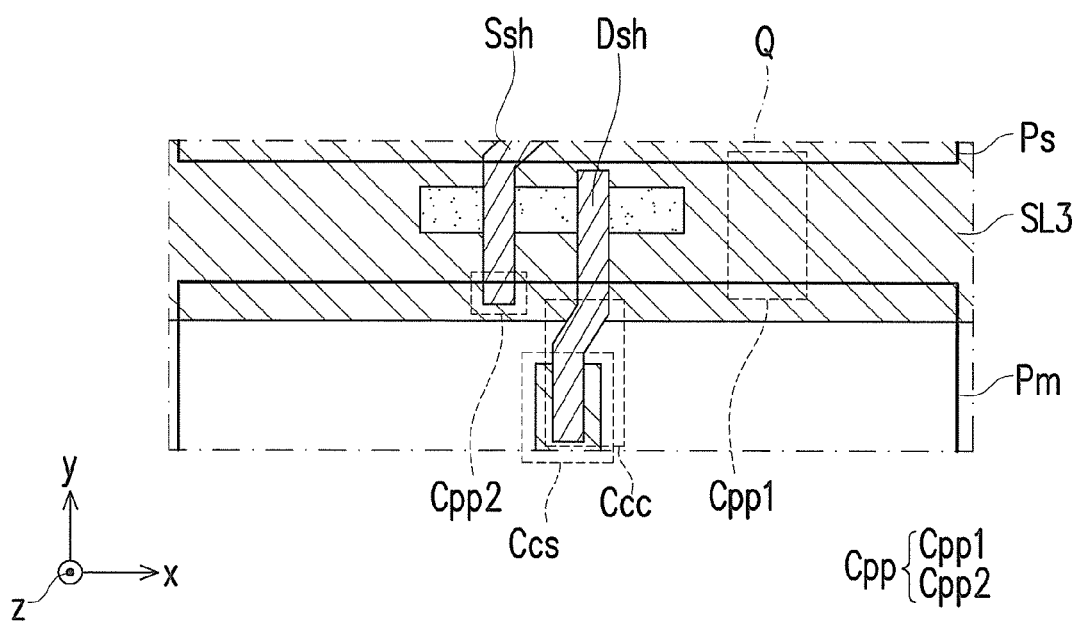
FIG. 9 is an enlarged schematic of a partial region Q of FIG. 8.

FIG. 8 shows another layout of two adjacent pixel units of FIG. 1 located in the same row. FIG. 9 is an enlarged schematic of a partial region Q of FIG. 8. Pixel units 100C and 100D of FIG. 8 are similar to the pixel units 100A and 100B of FIG. 4, and the relationship of electrical connection between each of the components of the pixel units 100C and 100D is the same as the relationship of electrical connection between each of the components of the pixel units 100A and 100B. Therefore, the same or corresponding components are represented by the same or corresponding reference numerals. The main difference between the pixel units 100C and 100D of FIG. 8 and the pixel units 100A and 100B of FIG. 4 is in the structure. Specifically, the position where the second capacitance Ccc of FIG. 6 is formed and the position where the second capacitance Ccc of FIG. 9 is formed are slightly different; and the position where the sharing capacitance Ccs of FIG. 4 is formed and the position where the sharing capacitance Ccs of FIG. 9 is formed are significantly different. The following mainly describes the difference, and the similarities of the two are as described above and are not repeated herein.

Referring to FIG. 8 and FIG. 9, each of the pixel units 100C includes the scan line GL3, the data line DL+, the active device T electrically connected to the scan line GL3 and the data line DL−, the main pixel electrode Pm and the sub-pixel electrode Ps respectively electrically connected to the active device T and separated from each other, the signal line SL3 disposed parallel to the scan line GL3, the sharing switch device Tsh having the gate Gsh, the source Ssh, and the drain Dsh, and the sharing capacitor Ccs. The gate Gsh of the sharing switch device Tsh is electrically connected to the signal line SL3, and the sharing capacitor Ccs is electrically connected to the drain Dsh of the sharing switch device Tsh.

The coupling capacitance Cpp1 (labeled in FIG. 9) is between the sub-pixel electrode Ps of each of the pixel units 100C and the main pixel electrode Pm of the next pixel unit 100D. Specifically, the sub-pixel electrode Ps of each of the pixel units 100C and the main pixel electrode Pm of the next pixel unit 100D are overlapped in the row direction y and a dielectric substance (not shown) is between the two, thus forming the coupling capacitance Cpp1. The coupling capacitance Cpp2 (labeled in FIG. 9) is between the source Ssh of the sharing switch device Tsh of each of the pixel units 100C and the main pixel electrode Pm of the next pixel unit 100D. Specifically, the source Ssh of the sharing switch device Tsh of each of the pixel units 100C and the main pixel electrode Pm of the next pixel unit 100D are overlapped in the z-direction and a dielectric substance (not shown) is between the two, thus forming the coupling capacitance Cpp2. The sum of the coupling capacitance Cpp1 and the coupling capacitance Cpp2 is the first capacitance Cpp (labeled in FIG. 9). The second capacitance Ccc (labeled in FIG. 9) is between the drain Dsh of the sharing switch device Tsh of each of the pixel units 100C and the main pixel electrode Pm of the next pixel unit 100D. (Ccc/Cpp) is also designed in the range of 5% to 25%.

After comparing the second capacitance Ccc of FIG. 6 and the second capacitance Ccc of FIG. 9, it can be known that the main difference between the two is as follows. The overlapping region of the lower electrode (i.e., the drain Dsh of the sharing switch device Tsh of the pixel unit 100A) and the upper electrode (i.e., the main pixel electrode Pm of the next pixel unit 100B) of the second capacitance Ccc of FIG. 6 is on the edge of the main pixel electrode Pm of the pixel unit 100B. In other words, the second capacitance Ccc of FIG. 6 is mainly formed on the edge of the main pixel electrode Pm of the next pixel unit 100B. On the other hand, in the second capacitance Ccc of FIG. 9, the lower electrode (i.e., the drain Dsh of the sharing switch device Tsh of the pixel unit 100C) of the second capacitance Ccc is extended further inside the main pixel electrode Pm of the next pixel unit 100D corresponding to the area below the plane of the figure in comparison to the lower electrode (i.e., the drain Dsh of the sharing switch device Tsh of the pixel unit 100A) of FIG. 6, and a large portion of the area of the lower electrode (i.e., the drain Dsh of the sharing switch device Tsh of the pixel unit 100D) of the second capacitance Ccc is distributed inside the main pixel electrode Pm of the next pixel unit 100D. Therefore, the second capacitance Ccc is mainly faulted on the inside of the main pixel electrode Pm of the next pixel unit 100D.

After comparing the capacitance Ccs of FIG. 4 and the capacitance Ccs of FIG. 8, it can be known that the main difference between the two is as follows. The upper electrode (i.e., the drain Dsh of the sharing switch device Tsh of the pixel unit 100A) and the lower electrode (i.e., the common voltage line CLs overlapped with the sub-pixel electrode Ps of the pixel unit 100A) of the capacitance Ccs of the pixel unit 100A of FIG. 4 are both below the sub-pixel electrode Ps of the pixel unit 100A to which the electrodes belong. On the other hand, in the capacitance Ccs of the pixel unit 100C, the upper electrode (i.e., the drain Dsh of the sharing switch device Tsh of the pixel unit 100C) of the capacitance Ccs of the pixel unit 100C is extended below the main pixel electrode Pm of the next pixel unit 100D and overlapped with the common voltage line CLm (i.e., the lower electrode of the capacitance Ccs) located below the main pixel electrode Pm of the next pixel unit 100D, thus forming the capacitance Ccs of the pixel unit 100C. In other words, in the embodiment of FIG. 8, the capacitance Ccs of each of the pixel units 100C can be formed on the main pixel electrode Pm of the next pixel unit 100D, and does not need to be formed on the sub-pixel electrode Ps of the pixel unit 100A to which the capacitance Ccs belongs as in the embodiment of FIG. 4.

It should be mentioned that, the relative position between each of the components of each of the pixel units and the relative position among a plurality of components of two adjacent pixel units of FIG. 4 and FIG. 8 are exemplary, and other suitable layout designs can be used for the two according to actual demand. All equivalent circuits formed by the pixel array are similar to FIG. 5 and (Ccc/Cpp) falls in the range of 5% to 25%. Regardless of the actual layout of each of the pixel units of the pixel arrays, the pixel arrays are all within the scope of the invention to be protected.

Based on the above, in the pixel array of an embodiment of the invention, (Ccc/Cpp) is designed in a specific range of 5% to 25%. In this way, even if the charging of the liquid crystal capacitance formed by the main pixel electrode and the sub-pixel electrode of the next pixel unit is complete before the charging of the liquid crystal capacitance formed by the main pixel electrode and the sub-pixel electrode of a pixel unit, via the self-compensation mechanism of the second capacitance Ccc and the first capacitance Cpp, the voltage on the liquid crystal capacitance of the next pixel unit is not readily excessively dispersed onto the liquid crystal capacitance of a pixel unit. As a result, the issue of bright/dark lines in the known techniques is alleviated.

Although the invention has been described with reference to the above embodiments, it will be apparent to one of the ordinary skill in the art that modifications and variations to the described embodiments may be made without departing from the spirit and scope of the invention. Accordingly, the scope of the invention will be defined by the attached claims not by the above detailed descriptions.

What is claimed is:

1. A pixel array, comprising a plurality of pixel units, wherein each of the pixel units comprises:
   a scan line and a data line;
   an active device electrically connected to the scan line and the data line;
   a main pixel electrode and a sub-pixel electrode respectively electrically connected to the active device, wherein the main pixel electrode and the sub-pixel electrode are separated from each other;
   a signal line disposed parallel to the scan line;
   a sharing switch device comprising a gate, a source, and a drain, wherein the gate is electrically connected to the signal line, and the source is electrically connected to the active device and the sub-pixel electrode;
   a sharing capacitor electrically connected to the drain of the sharing switch device;
   a first capacitance Cpp, wherein a terminal of the first capacitance Cpp is electrically connected to the source of the sharing switch device and the sub-pixel electrode, and another terminal of the first capacitance Cpp is electrically connected to the main pixel electrode of a next pixel unit; and
   a second capacitance Ccc, wherein a terminal of the second capacitance Ccc is electrically connected to the drain of the sharing switch device, and another terminal of the second capacitance Ccc is electrically connected to the main pixel electrode of the next pixel unit, wherein $5\% \leq (Ccc/Cpp) \leq 25\%$.

2. The pixel array of claim 1, wherein the first capacitance Cpp comprises a sum of a coupling capacitance (Cpp1) between the sub-pixel electrode and the main pixel electrode of the next pixel unit and a coupling capacitance (Cpp2) between the source of the sharing switch device and the main pixel electrode of the next pixel unit.

3. The pixel array of claim 1, wherein the second capacitance Ccc comprises a coupling capacitance between the source of the sharing switch device and the main pixel electrode of the next pixel unit.

4. The pixel array of claim 1, wherein $10\% \leq (Ccc/Cpp) \leq 20\%$.

5. The pixel array of claim 1, wherein the signal line is located between the sub-pixel electrode and the main pixel electrode of the next pixel unit.

6. The pixel array of claim 1, wherein the scan line is located between the main pixel electrode and the sub-pixel electrode.

7. The pixel array of claim 1, wherein the sharing capacitor comprises a lower electrode and an upper electrode, the lower electrode is electrically connected to a common voltage, and the upper electrode is electrically connected to the drain of the sharing switch device.

8. The pixel array of claim 1, wherein the pixel unit further comprises a main storage capacitor and a sub-storage capacitor, the main storage capacitor is electrically connected to the main pixel electrode, and the sub-storage capacitor is electrically connected to the sub-pixel electrode.

9. The pixel array of claim 1, wherein:
   the pixel units are arranged in a plurality of rows and a plurality of columns, the data lines of the pixel units are divided into a plurality of first-polarity data lines and a plurality of second-polarity data lines, in one of the rows of pixel units, the pixel units in the first column and the second column are electrically connected to one of the first-polarity data lines, and the pixel units in the third column and the fourth column are electrically connected to one of the second-polarity data lines.

10. The pixel array of claim 9, wherein in the next row of pixel units, the pixel units in the first column and the second column are electrically connected to another one of the second-polarity data lines, and the pixel units in the third column and the fourth column are electrically connected to another one of the first-polarity data lines.

11. The pixel array of claim 10, wherein in yet another row of pixel units, the pixel units in the first column and the second column are electrically connected to yet another one of the first-polarity data lines, and the pixel units in the third column and the fourth column are electrically connected to yet another one of the second-polarity data lines.

12. The pixel array of claim 11, wherein the pixel units located in one of the rows are red pixel units, the pixel units located in the next row are green pixel units, and the pixel units located in the yet another row are blue pixel units.

* * * * *